No. 736,248. PATENTED AUG. 11, 1903.
H. HALSEY.
ELECTRIC BATTERY.
APPLICATION FILED DEC. 13, 1902.
NO MODEL.
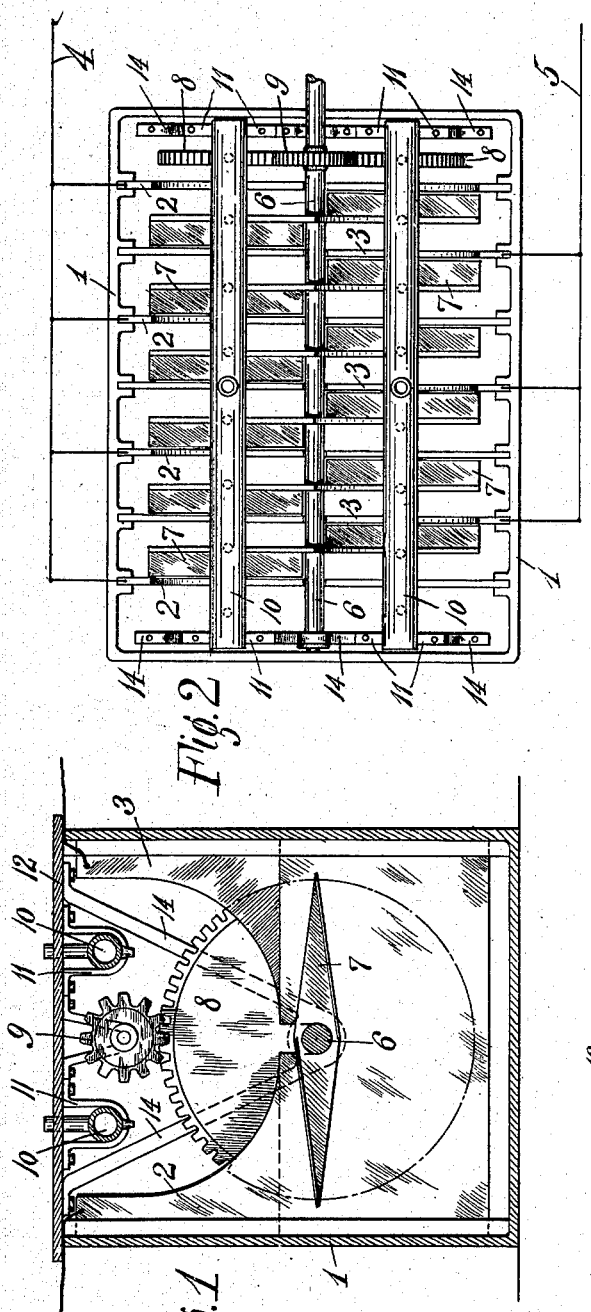
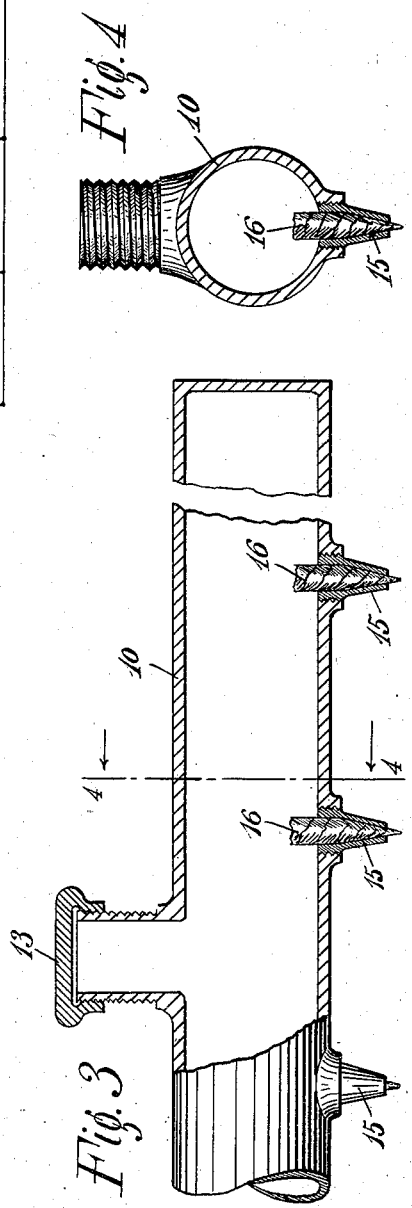
Witnesses
Julian S. Wooster
Lester C. Taylor
Henry Halsey Inventor
By his Attorney C. N. Edwards No. 736,248. Patented August 11, 1903.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 736,248, dated August 11, 1903.

Original application filed April 18, 1902, Serial No. 103,649. Divided and this application filed December 13, 1902. Serial No. 135,144. (No model.)

*To all whom it may concern:*

Be it known that I, HENRY HALSEY, a citizen of the United States, residing at New York, in the county of New York and State of New York, have invented certain new and useful Improvements in Electric Batteries, of which the following is a full, clear, and exact specification.

This invention relates to electric batteries, and has particular reference to a receptacle for containing and feeding a depolarizing fluid to the electrolyte.

In the drawings, Figure 1 is a cross-section of a battery, showing two receptacles in position. Fig. 2 is a plan view of the battery shown in Fig. 1. Fig. 3 is a longitudinal view, partially in section, of my improved receptacle; and Fig. 4 is a section on the line 4 4 of Fig. 3.

In this application I do not claim the particular construction of battery having a depolarizing brush or stirrer, such construction having been described and claimed in my application, Serial No. 103,649, filed April 18, 1902, of which this application is a division.

1 represents a casing containing conventional elements 2 2 2 2 3 3 3, alternately arranged and suitably connected to the line-terminals 4 5. Each of the elements is cut away, as shown in Fig. 1, to permit the shaft 6, carrying the brushes 7, to be immersed in the liquid. The shaft is carried by a hanger 14 and the casing and is rotated by the gears 8 9 in a well-known manner. Suitably attached to the casing transversely to the elements are the reservoirs 10. I have shown them as carried by hangers 11, which are attached to the cover 12; but I do not limit myself to any particular location or manner of mounting the reservoirs on the casing. Each reservoir comprises a hollow receptacle 10, having one or more nozzles 15. In each nozzle is contained a core 12, of blotting-paper or other absorbent material of high capillarity, which will permit the liquid contained in the reservoir to be gradually fed to the electrolyte.

13 is a cover.

In practice the reservoir is usually placed transversely to the elements, with the nozzles over the spaces between the elements. As the depolarizer is fed to the electrolyte it is thoroughly mixed with it by the brushes or stirrers 7 and polarization thereby prevented. Two reservoirs may be used, one containing depolarizing solution, as bichromate of potash, and the other for acid.

The depolarizing solution and the acid in the reservoirs will by capillary attraction pass through the cores 12 and drop by drop fall into the electrolyte. By projecting the inner end of the core into the tube solid matter in the bottom of the reservoir will not clog the entire surface of the core.

Having thus described my invention, I declare that what I claim as new, and desire to secure by Letters Patent, is—

1. In a battery, the combination with the elements and the electrolyte, of a receptacle adapted to contain a fluid, an opening from said receptacle to the electrolyte and a core of capillary material located in said passage, substantially as described.

2. In a battery, the combination with the elements and the electrolyte, of a receptacle adapted to contain a fluid, an opening from said receptacle to the electrolyte, and a core of capillary material located in said passage, said core projecting into the liquid in said receptacle beyond the inner surface, substantially as described.

3. In a battery, the combination with the elements and the electrolyte, of a receptacle located above the electrolyte having means for feeding a fluid drop by drop from the receptacle to the electrolyte, and means for mixing the fluid with the electrolyte, substantially as described.

In testimony whereof I affix my signature in presence of two witnesses.

HENRY HALSEY.

Witnesses:
JULIAN S. WOOSTER,
HENRY BEST.